United States Patent [19]
Pfeiffer et al.

[11] Patent Number: 4,955,644
[45] Date of Patent: Sep. 11, 1990

[54] DRILL PIPE COUPLING

[75] Inventors: Gerd Pfeiffer, Mülheim; Erich Quadflieg, Krefeld; Friedrich Lenze, Ratingen; Krug, Gerhard, Duisburg; Josef Siekmeyer, Ratingen, all of Fed. Rep. of Germany

[73] Assignee: Mannesmann Aktiengellschaft, Düsseldorf, Fed. Rep. of Germany

[21] Appl. No.: 386,786

[22] Filed: Jul. 27, 1989

[30] Foreign Application Priority Data

Jul. 28, 1988 [DE] Fed. Rep. of Germany ....... 3825995

[51] Int. Cl.$^5$ .............................................. F16L 25/00
[52] U.S. Cl. ..................................... 285/333; 285/397
[58] Field of Search ............... 285/333, 334, 370, 397, 285/355, 390; 403/343

[56] References Cited

U.S. PATENT DOCUMENTS

| | | | |
|---|---|---|---|
| 1,932,427 | 10/1933 | Stone | 285/33 A |
| 4,192,533 | 3/1980 | Blose | 285/334 |
| 4,506,432 | 3/1985 | Smith | 285/334 X |

FOREIGN PATENT DOCUMENTS

1127712 12/1956 France ................................ 285/333

*Primary Examiner*—Dave W. Arola
*Attorney, Agent, or Firm*—Cohen, Pontani & Lieberman

[57] ABSTRACT

A drill pipe coupling includes a coupling member (2) having an unthreaded central section (13) with a cylindrical bore (26) therein and an outer shoulder (11,12) on each side thereof. Adjoining the shoulders are respective conical external threads for threading into an internal correspondingly threaded upset head section of a drill pipe formed as a bell elements and including end surfaces (9,10). The drill pipe has an undeformed cylindrical bore (14) connected to the threaded upset head. The drill pipe end surfaces (9,10) sealingly abut the outer shoulders (11,12) of the central section (13) when the pipes are joined together. The drill pipe has an intermediate section (16) adjoining the cylindrical bore (14) and has an inside diameter which decreases in the direction toward the threaded section (5, 6). A cylindrical bore section (18) adjacent the intermediate section (16) extends to the threaded section (5,6) and a rounded transition is located between the cylindrical bore (14) of the undeformed pipe (8) and the intermediate section (16). The drill pipe has an outer shoulder (33) opposite the cylindrical bore section (18) and the outside diameter of the drill pipe in the upset region (23) of the shoulder (33) is identical to or greater than the outside diameter (21) of the undeformed pipe (8) and the length of the region (23) is greater than the length of the intermediate section (16).

9 Claims, 1 Drawing Sheet

DRILL PIPE COUPLING

FIELD OF THE INVENTION

The present invention relates to a drill pipe coupling having an unthreaded thickened central section and laterally extending conical external threads for connection to complementary developed internal threaded sections of a drill pipe end so that in joined condition the pipe ends sealingly abut the outer shoulders of the central section.

BACKGROUND OF THE INVENTION

A pipe coupling is known from U.S. Pat. No. 1,932,427, which discloses a flush coupling with a coupling member (pin member 12), the threaded ends of which, developed as spigot elements, have a two-step conical thread. The pipe end which is developed as bell element (box 17) has an outer shoulder and an inner shoulder which lie, in screwed-together condition, in sealing fashion against the corresponding shoulders of the coupling member which is developed in a manner complementary thereto. The disadvantage of this solution is the strong radial inner thickening in the upset head of the pipe which greatly impairs the dynamic behavior of the coupling. As a result, this coupling is not suitable for extremely deep holes. Furthermore, upon installation an elevator nipple must be screwed onto each drill pipe and removed again after the lowering of the pipe. An alternatively possible clamping device on the outside of the flush connection for the holding of the pipe string during the lowering easily leads to damage to the outer surface thereof and thus reduces the life of the drill pipe.

SUMMARY OF THE INVENTION

An object of the present invention is to provide a drill pipe coupling for extremely deep holes which, while maintaining essential dimensions prescribed by the standards, exhibits weight-optimized, better dynamic behavior than a corresponding standard coupling with welded couplers, and which can be manufactured at lower cost and which withstands operating stresses for longer periods of time.

This object is achieved by providing a drill pipe coupling comprising a coupling member having an unthreaded central section and a cylindrical bore therein and an outer shoulder on each side thereof; adjoining the shoulders are respective conical external threads; a drill pipe having an undeformed cylindrical bore and connected thereto an internal correspondingly threaded upset head section formed as a bell element and having end surfaces, the drill pipe end surfaces sealingly abutting the outer shoulders of the central section when joined together; the drill pipe comprising an intermediate section adjoining the cylindrical bore and having an inside diameter which decreases in the direction toward the threaded section; a cylindrical bore section adjacent the intermediate section extending to the threaded section; a rounded transition between the cylindrical bore of the undeformed pipe and the intermediate section; the drill pipe having an outer shoulder opposite the cylindrical bore section, the outer diameter of the drill pipe in the upset region of the shoulder being identical to or greater than the diameter of the undeformed pipe and the length of the region being greater than the length of the intermediate section; the external threads of the coupling member being radially inwardly thickened and having at the ends thereof a bevelled section pointing toward the inside of the coupling member; and the outside of the central section of the coupling member being greater than the diameter of the bell elements abutting the shoulders of the coupling member. Advantageous further embodiments are set forth hereinafter.

The proposed drill pipe coupling is characterized by the fact that the cross-sectional transitions are developed dynamically equivalent. To this end, the difference from the outside wall thickness of the undeformed pipe to the thickened spigot application region of the upset head takes place only in small steps and with rounded transitions. In this connection, the radial inner upset is slight and has a value equal to or less than 7%. Similarly, the increase in the outside diameter in the upset region of the pipe proceeds from the starting value of the rated dimension in the form of a slope to a value which lies slightly below the maximum value corresponding to the API standard. This radial outer thickening which is provided in addition to the radial inner thickening, increases the wall thickness in the critical region of the commencement of the elevator shoulder, and the cross-section in this region is at least 30% greater than that of the undeformed pipe.

Another advantage is that the outside diameter of the central part of this joint is greater than the bell part of the adjoining pipes so that the place of wear, caused by the contacting of the pipe with the wall of the bore hole, lies intentionally on an easily exchangeable element. In addition, a wear-proof armoring can be applied in known manner on this outer surface. In this way, replacement of the expensive drill pipes is substantially avoided.

The proposed drill pipe coupling considerably increases the life of the drill pipe string. As is known, the drill pipe is caught in wedges after each lowering of a pipe length. This place on the pipe on which the wedges act is a wear point since upon each making up or breaking down, i.e. each unscrewing or rescrewing, practically the same place more or less is grasped by this device. Since the pipe of this present invention is developed similarly at both ends, it can also be turned by 180 degrees so that a new place of the pipe surface comes into contact with the wedges. The same is true also for the wear of the threaded section on the unscrewing or rescrewing point. Before the critical state of wear for complete replacement is reached, the pipe is turned 180 degrees and the threaded section which was previously screwed only once is placed at this point of unscrewing.

The threaded section of the coupling means and of the pipes preferably has a thread which is in accord with the API standard. This way, a high degree of replaceability is assured since even pipes of different development and accessories having a thread in accordance with the API standard can be screwed together with such a coupling.

The axial length of the thickened central part is kept as short as possible in order to save weight. Ordinarily, however, it is somewhat longer than would be necessary for the grasping of the tongs so that the worn thread can still be chased. The standard bore and outside dimensions of the coupling member correspond to the API standard. This is true also of the taper at the two ends of the central part thereof.

The novel proposed drill pipe coupling is equivalent, with respect to its static loadability, to a Standard API coupling with welded couplers. However, the dynamic behavior thereof is advantageous in view of the better adapted cross-sectional transitions and, as a result of the elimination of the weld seam, it is less susceptible to corrosive attack by hydrogen sulfide. One advantage in the manufacture of the proposed drill pipe coupling results from the fact that, despite twice the number of threads required, greater technical expense is saved due to the elimination of the seam and all the work connected therewith.

BRIEF DESCRIPTION OF THE DRAWING

An embodiment of the drill pipe coupling of the invention will be further described below with reference to the drawing, in which.

DETAILED DESCRIPTION OF THE PRESENTLY PREFERRED EMBODIMENT

Figure 1:
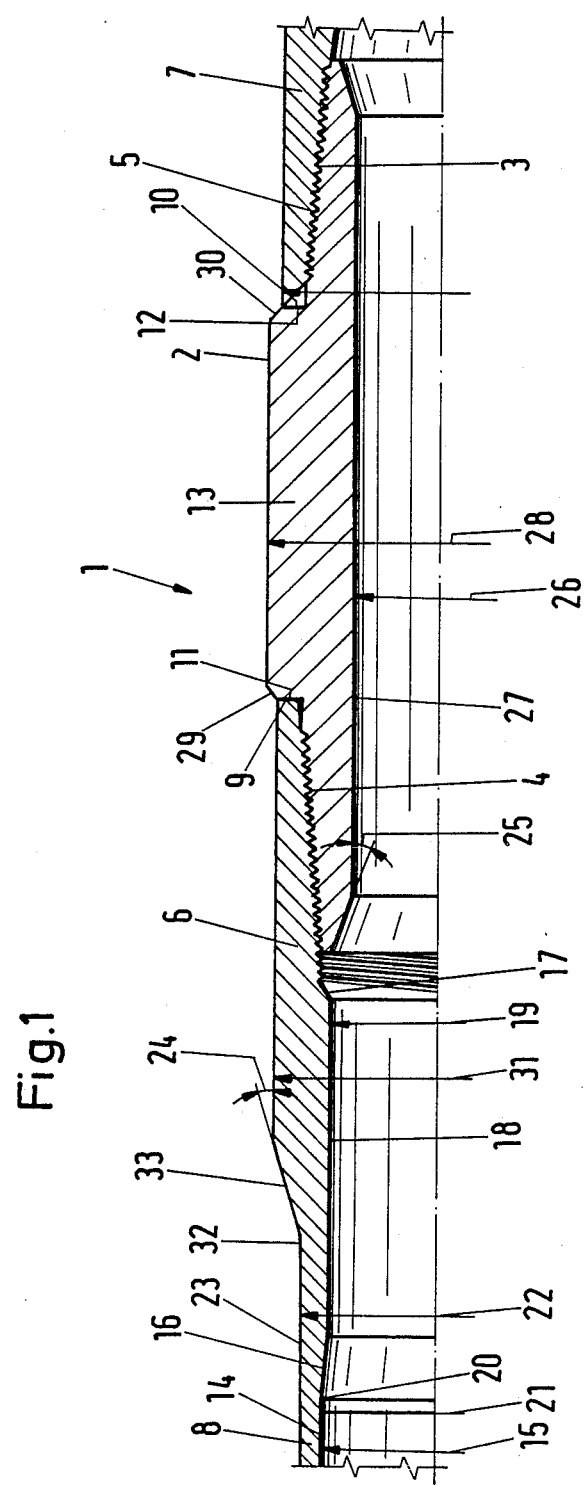
FIG. 1 is half of a longitudinal cross-sectional view through the drill pipe coupling of the invention.

FIG. 1 shows half of a longitudinal section through the drill pipe coupling 1 of the invention. The coupling comprises a coupling member 2 having two conically developed or tapered sections 3, 4 which can be screwed together with the threaded sections 5, 6 of the two pipes 7, 8, which sections are developed complementary to each other. The ends of the pipes 7, 8 are upset or thickened and the end surfaces 9, 10 of the pipe ends, and are developed as bell elements so as to lie, in their connected condition, in sealing fashion against the outer shoulders 11, 12 of the central section part 13 of the coupling member 2. The cylindrical bore 14 of the undeformed pipe 8, the inside dimension of which is indicated by the arrow 15, is followed by an intermediate section 16, the inside diameter of which decreases in the direction toward the threaded connection. Adjoining intermediate section 16 is a cylindrical bore 18 which extends up to the end 17 of the threaded section 6 and the inside diameter of which is indicated by the arrow 19. The transition 20 from the cylindrical bore 15 of the undeformed pipe 8 to the intermediate section 16 is strongly rounded.

On the outside, the outside diameter (indicated here by the arrow 21) of the undeformed pipe 8 increases continuously in the direction of the elevator shoulder 33, the largest value, represented here by the arrow 22, being somewhat below the maximum value which is permissible in accordance with the standard. The axial length of the outer region 23 is greater than the substantially opposite intermediate section 16. The elevator shoulder 33 is inclined in accordance with the standard by 18 degrees. The angular position is indicated by the arrow 24. The threaded sections 3, 4 of the coupling member 2 which are developed as spigot elements are thickened radially inward and the ends are beveled by less than 30 degrees. The angular position of this bevel is shown by arrow 25. The inside diameter 26 of the cylindrical bore 27 of the coupling member 2 and the outside diameter 28 of the central section 13 as well as the bevel 29, 30 on the ends of the central part 30 correspond preferably to the API standard. It is also preferred in this connection that the outside diameter 28 of the central section 13 is greater than the outside diameter 31 of the bell part. In this way, the wear zone is located in an easily exchangeable part.

Since these as well as further embodiments and modifications thereto are intended to be within the scope of the present invention, the above description should be construed as illustrative and not in a limiting sense, the scope of the invention being defined solely by the following claims.

What is claimed is:

1. A drill pipe coupling comprising: a coupling member (2) comprising an unthreaded central section (13) having a cylindrical bore (26) therein and an outer portion having outer shoulders (11, 12) on each side thereof; and adjoining said shoulders axially extending respective conical external threads (3, 4);

a drill pipe comprising an undeformed cylindrical bore (14) and connected thereto an internal correspondingly threaded upset head section formed as a bell element having end surfaces (9, 10), said drill pipe end surfaces (9, 10) sealingly abutting said outer shoulders (11, 12) of said central section (13) when joined together;

said drill pipe further comprising an intermediate section (16) adjoining said cylindrical bore (14) and having an inside diameter which decreases in the direction toward said threaded section (5, 6);

a cylindrical bore section (18) adjacent said intermediate section (16) extending to said threaded section (5, 6);

a rounded transition between said cylindrical bore (14) of said undeformed pipe (8) and said intermediate section (16);

an outside shoulder (33) opposite said cylindrical bore section (18), the outside diameter of said pipe in the upset region (23) of said shoulder (33) being at least equal to the outside diameter (21) of said undeformed pipe (8) and the length of said region (23) being greater than the length of said intermediate section (16);

said external threads (3, 4) being radially inwardly thickened and having at the ends thereof a bevelled section pointing towards the inside of said coupling member (2); and the outside diameter (28) of said central section (13) of said coupling member (2) being greater than the diameter (31) of said bell elements abutting said shoulders (11, 12) of said coupling member (2).

2. The drill pipe coupling according to claim 1, wherein said axial length of said central section (13) of said coupling member (2) is at least equal to the required minimum dimension for the application of tongs.

3. The drill pipe coupling according to claim 1, wherein the outside diameter of said pipe in said upset region (23) increases to a value below a maximum value prescribed in accordance with the API standard.

4. The drill pipe coupling according to claim 1, wherein said threaded sections (3, 4) of said coupling member (2) and said threaded sections (5, 6) of said pipes (7, 8) to be connected have a standard API thread.

5. The drill pipe coupling according to claim 1, wherein the difference in the inside diameter from the cylindrical bore (14) of the undeformed pipe (8) to the cylindrical bore (18) of said upset head is at least 7%.

6. The drill pipe coupling according to claim 1, wherein said shoulder (33) is inclined (24) by about 18°.

7. The drill pipe coupling according to claim 6, wherein the cross-section at the starting end (32) of said shoulder (33) is at least about 30% greater than the cross-section of said undeformed pipe (8).

8. The drill pipe coupling according to claim 1, wherein the cross-section at the starting end (32) of said shoulder (33) is at least about 30% greater than the cross-section of said undeformed pipe (8).

9. The drill pipe coupling according to claim 1, wherein said center section (13) additionally comprises bevelled sections (29, 30) at the lateral ends thereof; the inside diameter of said cylindrical bore (26), the outside diameter (28) and the bevels (29, 30) on the ends of said central section (13) of said coupling member (2) corresponding to the API standard.

* * * * *